Jan. 4, 1966  G. G. RITTENHOUSE  3,227,376
SPRAYING VEHICLE FOR USE IN AGRICULTURE
Filed Dec. 12, 1963  2 Sheets-Sheet 1

INVENTOR
GLEN G. RITTENHOUSE
BY: Fetherstonhaugh & Co.
ATTORNEYS

Jan. 4, 1966  G. G. RITTENHOUSE  3,227,376
SPRAYING VEHICLE FOR USE IN AGRICULTURE
Filed Dec. 12, 1963  2 Sheets-Sheet 2
FIG. 3
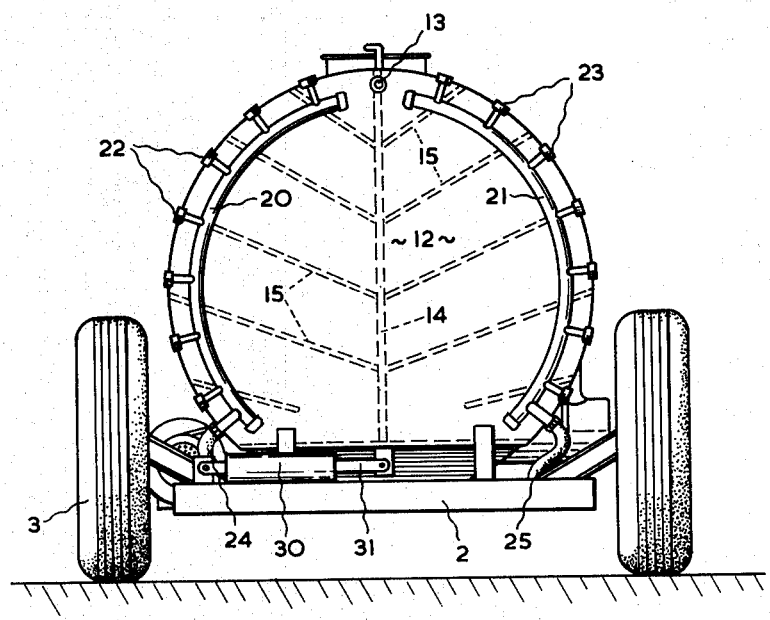
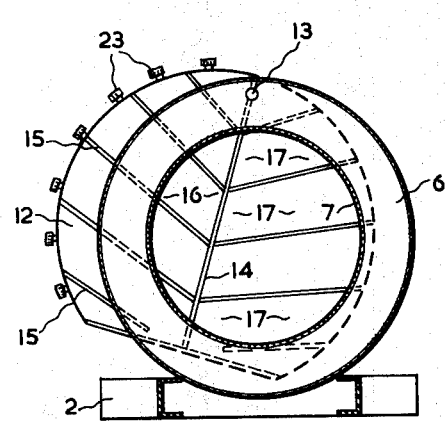
FIG. 4
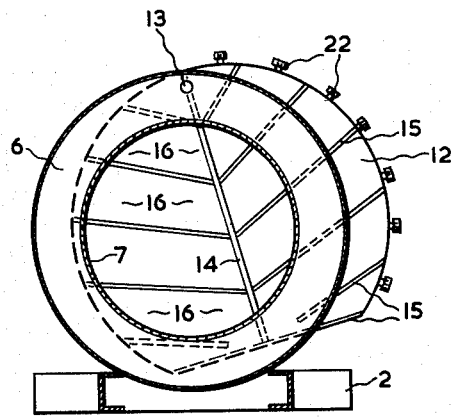
FIG. 5
INVENTOR
GLEN G. RITTENHOUSE
BY: Fetherstonhaugh & Co.
ATTORNEYS

United States Patent Office 3,227,376
Patented Jan. 4, 1966

3,227,376
SPRAYING VEHICLE FOR USE IN AGRICULTURE
Glen G. Rittenhouse, Jordan Station, Ontario, Canada, assignor to M. K. Rittenhouse & Sons Limited, Jordan Station, Ontario, Canada, a corporation of Ontario
Filed Dec. 12, 1963, Ser. No. 330,128
7 Claims. (Cl. 239—78)

My invention relates to improvements in mechanisms for generating spraying mist, as incorporated in vehicles for use in spraying trees and, in particular, rows of orchard trees, grape vines and the like. Such type of vehicle, in general, comprising a spraying liquid containing tank, a pump for withdrawing liquid from the tank and expelling the liquid through a plurality of jet nozzles into the atmosphere, the ejected liquid being converted into a mist spray by use of a rotary fan positioned adjacently to the jet nozzles and generating an air blast ejected from the vehicle and towards which the liquid spray nozzles are directed.

Due to spiralling turbulence inherent in a rotary blade fan created air draft, it has been very difficult in the foregoing type of spraying vehicle to obtain balanced and constant velocity of the air streams past the jet nozzles and thus it has always been a problem to attain a uniform discharge of spray mist from both sides of a spraying vehicle as it is moved along a path between rows of trees.

One of the principal objects of this invention is therefore to provide a spraying vehicle so arranged that spiralling air draft created by a rotary fan is diverted into an air stream flowing in a substantially straight path in uniform velocity to the location of the jet nozzles from which the spray liquid is ejected, the device broadly comprising a horizontal sleeve, a driven fan located at one end of the sleeve to create an air draft flowing through the sleeve and a plurality of jet nozzles located at the other end of the sleeve, the spiralling air turbulence created by the fan being channeled into a uniform straight path of flow towards the nozzles by length of travel through the sleeve and also preferably guided by provision of a plurality of stationary vanes contained within the sleeve intermediately of the length of the sleeve and past which the fan created air draft flows.

A further object of the invention is to provide two similarly arranged sets of radially directed jet nozzles carried upon the circumferential portion of the outer face of a vertical circular plate positioned in front of and spaced away from the end of the sleeve, the inner face of the plate carrying a plurality of upwardly inclined flanges defining two oppositely and outwardly directed sets of air stream receiving channels opening into the space between the end of the sleeve and the inner face of the plate, the plate being mounted for transverse swingable adjustment relatively to the axis of the sleeve and whereby the angularity of the paths of spray ejected from either side of the vehicle may be readily adjusted.

A still further object of the invention is to provide a construction wherein the sleeve is open ended and constitutes the inner circumferential wall of a tubular spraying liquid containing tank extending lengthwise of the vehicle.

With the foregoing and other objects in view, as shall appear, my invention consists of a liquid spraying vehicle constructed and arranged all as hereinafter more particularly described, and illustrated in the accompanying drawings, in which:

FIG. 3 is an enlarged view of the rear end of the vehicle.

FIG. 4 is a vertical cross-sectional view through the vehicle tank and sleeve, being taken through the line 4—4, FIG. 1, and showing the air stream deflecting plate swung towards one side of the vehicle, and FIG. 5 is a similar view to FIG. 4, and showing the air stream deflecting plate swung towards the other side of the vehicle.

Like characters of reference indicate corresponding parts in the different views of the drawings.

Figure 1:
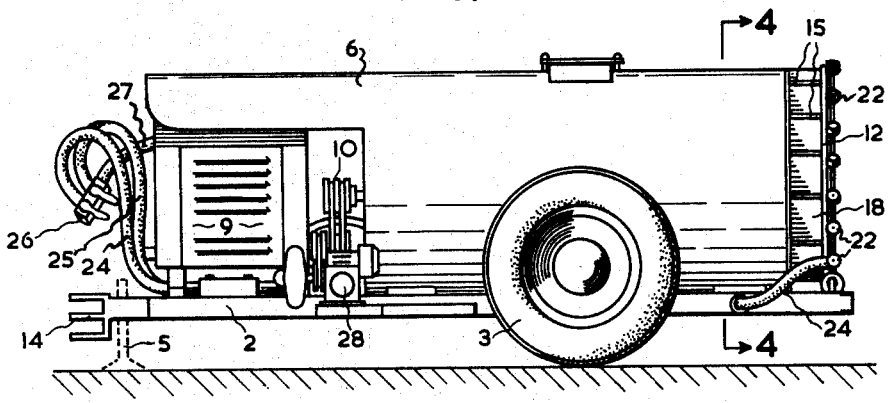
FIG. 1 is a side elevational view of the spraying vehicle.

The spraying vehicle, as illustrated in the drawings, is arranged to be towed by a tractor, and broadly comprises a chassis frame 2 mounted upon a pair of road wheels 3, the forward end of the chassis being provided with a coupling member 4 for attachment to a tractor (not shown), a removable chassis supporting jack 5 being shown in dotted lines.

The spraying liquid containing tank 6 is preferably of tubular form and extends lengthwise of the chassis the tank being of annular transverse cross section, the inner wall of the tank constituting a horizontal open ended elongated tubular sleeve 7 through which an air stream is directed. The air stream is generated by a power driven rotatable fan 8 positioned at the entrance to the forward open end of the sleeve. In the arrangement illustrated, a gasoline motor is contained within a housing 9 mounted upon the forward end of the chassis 2, the motor being provided to drive the fan through the medium of a usual fan belt and pulley assembly 10, and also to pump liquid from the tank to spray nozzles, as shall be described.

A vertical circular air stream deflecting plate 12 is provided to extend across and be positioned in spaced relation to the rear end of the sleeve 7, the upper portion of the plate being freely hung from a pin 13 protruding from the rear end of the tank 6 and about which the plate may be swung. The surface of the inner face of the plate 12 is bisected by a vertically extending flange 14, and from the side faces of which flange two similarly arranged upwardly inclined spaced apart sets of flanges 15 extend, the spaced apart flanges defining two sets of upwardly and outwardly inclined air stream receiving channels 16 and 17. The set of channels 16 direct the resultant smaller air streams upwardly and outwardly from one side of the space 18 between the plate 12 and the end of the tank and sleeve, and the set of channels 17 direct the corresponding resultant smaller air streams from the other side of the space 18.

As spiralling turbulence of an air stream created by a rotary fan tends to subside in relation to its distance of movement away from a fan, provision of the elongated sleeve 7 through which the air stream, created by the fan 8, travels to be diverted by the plate 12, is quite advantageous in reduction of turbulence in the air stream impinging upon and being diverted by the plate 12. However, as the air stream reaching the plate 12 must have a high velocity to carry out its purpose it still could have a residue spiralling turbulence if means were not provided to guide the air stream into a substantially straight flowing path before impacting the plate 12.

Figure 2:
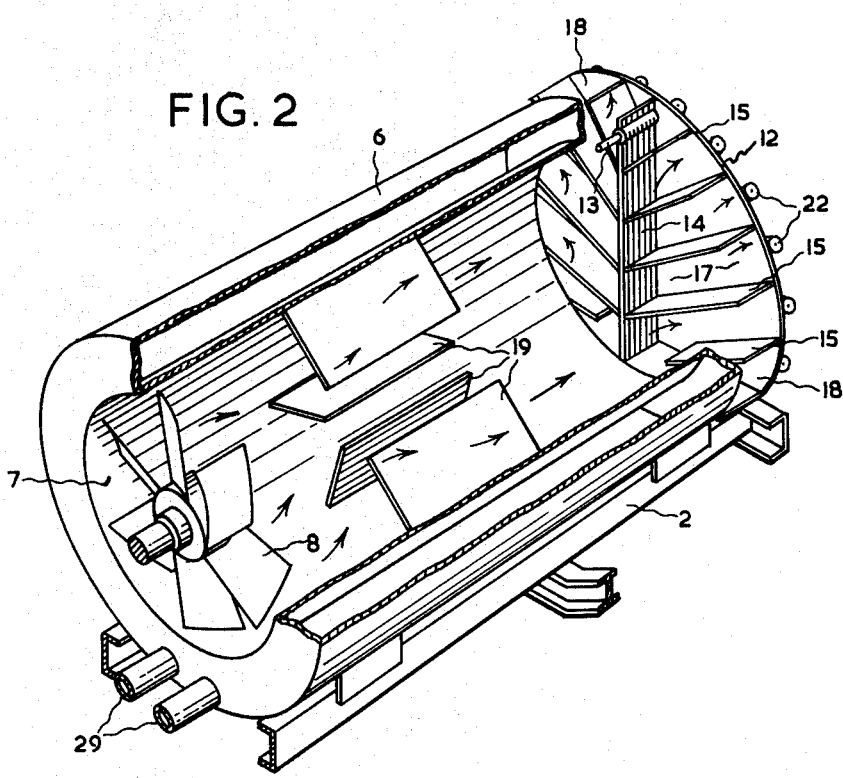
FIG. 2 is an enlarged perspective broken away view of the tubular spraying liquid containing tank, the inner wall of the tank constituting a sleeve through which the fan created air stream flows.

Referring to FIG. 2, it will be seen that I guide the spiralling air stream generated by the fan 8 into a straight flowing stream by provision of several stationary vanes 19 mounted within the sleeve 7 intermediately of its length, the vanes being preferably flat, radially positioned and extending longitudinally of the sleeve. As indicated by the arrows, the spiralling air stream upon leaving the fan in its travel through the sleeve 7, reaches the vanes 19, whereupon the vanes obstruct the spiral motion of the air stream and divert its movement into a straight path flowing from the vanes 19 to the plate 12.

The outer face of the plate 12 carries a pair of curved pipe lengths 20 and 21 and which support and feed spray liquid to two sets of spray nozzles 22 and 23, the nozzles being so adjusted in position that each ejects liquid spray into one of the air streams ejected from the space 18 between the plate 12 and the rear end of the sleeve member 7. Spray liquid contained within the tank 6 is fed to the sets of nozzles 22 and 23 through a pair of flexible hose lengths 24 and 25 and which are connected to a manually operable dual valve control 26. The control is in turn connected to a length of flexible hose 27 extending from a power driven pump 28 which is connected to the tank 6 by the pipes 29; the pump keeping the spray liquid in circulation through the tank to thus retain the ingredients of the spray liquid in suspension, the pump also delivering spray liquid, under pressure, to the valve control 26 which is so arranged that an operator may allow spray liquid, under pump pressure, to be directed to either or both of the sets of spray nozzles 22 and 23.

Referring to FIGS. 2 and 3 showing the swingably adjustable air stream deflecting plate 12 is in the central position, the plurality of air streams ejected from both sides of the vehicle from the two sets of channels 16 and 17 are at substantially similar inclinations and velocities, so that when the vehicle is travelling between two parallel rows of trees, with spray liquid being ejected from both sets of spray nozzles 22 and 23, both rows of trees receive similar applications of spray delivered at substantially the same height. Should it only be desired to spray a single row of trees, passage of spray liquid to one set of nozzles is cut off by closure of one of the valves in the control 26.

If conditions require adjustment of height or angularity of spray ejection, such objective is attained by swinging adjustment of the plate 12 to either side of the vehicle, as shown in FIGS. 4 and 5. Referring to FIG. 3, actuation of the plate 12 is accomplished by provision of a hydraulic piston assembly 30 mounted upon the chassis 2, the piston rod 31 being connected to the lower portion of the plate 12. In practice, the piston assembly 30 is connected to the standard hydraulic mechanism of the tractor towing the spraying vehicle and which is under control of the operator.

From the foregoing description it will be apparent that I have devised a very practical and simple spraying vehicle, and although I have shown and described a particular embodiment of the invention, it is to be understood that I do not necessarily limit myself to the exact details of my disclosure.

The embodiments of the invention in which an exclusive property or privilege is claimed are defined as follows:

1. A spraying vehicle comprising a chassis mounted upon road wheels, a horizontal open-ended elongated tubular sleeve mounted lengthwise of the chassis and having a longitudinal axis, a power-driven, air-stream-creating fan positioned in the vicinity of one end of the sleeve and arranged to direct its air stream through the length of the sleeve at sufficient velocity to be ejected from the other end of the sleeve, a vertically-disposed, air-stream-deflecting plate extending across and spaced from the sleeve other end, against the nearer face of which plate impinges the air stream issuing from the sleeve other end to be deflected outwardly through the space between the sleeve other end and the plate, a plurality of upwardly directed spaced apart flanges on the said nearer plate face and defining two sets of upwardly inclined air-stream-receiving channels, one set of channels directing air in respective smaller streams upwardly from one side of the said space between the sleeve other end and the plate, and the other set of channels directing air in respective smaller streams upwardly from the other side of said space, a plurality of jet nozzles located in the vicinity of the periphery of the plate adjacent the face thereof further from the sleeve other end with each nozzle directing liquid spray into a respective smaller air stream, a liquid container mounted on said chassis, and pipe means and power driven pump means connecting the container and the jet nozzles for conveying liquid under pressure from the container to the jet nozzles.

2. A spraying vehicle as claimed in claim 1, and comprising a vertically extending flange bisecting the said nearer plate face to bisect the impinging air stream, the said plurality of upwardly directed spaced apart flanges extending from the side faces of the vertically extending flange.

3. A spraying vehicle as defined in claim 1, wherein the plate is mounted for transverse swingable adjustment movement relatively to the longitudinal axis of the sleeve to constitute means for altering the inclinations of the two said sets of air stream receiving channels.

4. A spraying vehicle comprising a chassis mounted upon road wheels, an elongated tubular container for spraying liquid mounted lengthwise of the chassis and having a longitudinal axis, an open ended elongated tubular sleeve having a longitudinal axis and mounted in the interior of the tubular container with their longitudinal axes coextensive to form a compartment of annular transverse cross-section for the spraying liquid, a power-driven, air-stream-creating fan positioned in the vicinity of one end of the sleeve and arranged to direct its air stream through the length of the sleeve at sufficient velocity to be ejected from the other end of the sleeve, a vertically-disposed, air-stream-deflecting plate extending across and spaced from the sleeve other end, against the nearer face of which plate impinges the air stream issuing from the sleeve other end to be deflected outwardly through the space between the sleeve other end and the plate, a plurality of jet nozzles located in the vicinity of the periphery of the plate adjacent the face thereof further from the said sleeve other end, and directing liquid spray into the outwardly deflected air stream, and pipe means and power-driven pump means connecting the container and the jet nozzles for conveying the liquid under pressure from the container to the jet nozzles.

5. A spraying vehicle as claimed in claim 4, and comprising a plurality of upwardly directed spaced apart flanges on the said nearer plate face and defining two sets of upwardly inclined air-stream-receiving channels, one set of channels directing air in respective smaller streams upwardly from one side of the said space between the sleeve other end and the plate, and the other set of channels directing air in respective smaller streams upwardly from the other side of said space, each jet nozzle directing liquid spray into a respective smaller air stream.

6. A spraying vehicle as claimed in claim 5, and comprising a vertically extending flange bisecting the said nearer plate face to bisect the impinging air stream, the said plurality of upwardly directed spaced apart flanges extending from the side faces of the vertically extending flange.

7. A spraying vehicle as claimed in claim 4, wherein the plate is mounted for transverse swingable adjustment movement relatively to the axis of the sleeve to constitute means for altering the inclinations of the two said sets of air stream receiving channels.

References Cited by the Examiner
UNITED STATES PATENTS

| | | | |
|---|---|---|---|
| 2,476,960 | 7/1949 | Daugherty | 239—77 |
| 2,618,508 | 11/1952 | Daugherty | 239—77 |
| 2,886,249 | 5/1959 | Sidlow | 239—77 |

FOREIGN PATENTS

| | | |
|---|---|---|
| 150,367 | 5/1952 | Australia. |
| 227,444 | 7/1959 | Australia. |
| 698,625 | 10/1953 | England. |
| 154,048 | 4/1956 | Sweden. |

EVERETT W. KIRBY, *Primary Examiner.*